United States Patent
Messick, Jr.

(10) Patent No.: US 11,053,080 B2
(45) Date of Patent: Jul. 6, 2021

(54) EYELINK BELT DRIVE SYSTEMS AND METHODS

(71) Applicant: Cambridge International, Inc., Cambridge, MD (US)

(72) Inventor: George H. Messick, Jr., Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 16/709,363

(22) Filed: Dec. 10, 2019

(65) Prior Publication Data

US 2020/0189850 A1 Jun. 18, 2020

Related U.S. Application Data

(60) Provisional application No. 62/779,226, filed on Dec. 13, 2018.

(51) Int. Cl.
*B65G 17/08* (2006.01)
*B65G 15/48* (2006.01)
*B65G 17/06* (2006.01)

(52) U.S. Cl.
CPC ......... *B65G 17/083* (2013.01); *B65G 15/48* (2013.01); *B65G 17/06* (2013.01); *B65G 17/08* (2013.01)

(58) Field of Classification Search
CPC ........ B65G 23/06; B65G 15/48; B65G 23/04; B65G 23/00; B65G 17/083; B65G 17/08; B65G 17/064; B65G 17/063; B65G 17/062; B65G 17/061; B65G 17/06

USPC .......................................... 198/834, 835, 848
See application file for complete search history.

(56) References Cited

U.S. PATENT DOCUMENTS

| | | | |
|---|---|---|---|
| 1,835,406 A | 12/1931 | Kirsten | |
| 2,038,695 A | 4/1936 | Wilmot | |
| 4,989,723 A * | 2/1991 | Bode | B65G 17/08 198/635 |
| 5,101,966 A | 4/1992 | Lapeyre | |
| 5,518,109 A * | 5/1996 | Dailey | B65G 23/06 198/834 |
| 5,957,268 A | 9/1999 | Meulenkamp | |
| 10,287,098 B2 | 5/2019 | Maine, Jr. et al. | |

(Continued)

FOREIGN PATENT DOCUMENTS

| | | |
|---|---|---|
| DE | 1602634 A1 | 3/1970 |
| FR | 1597154 A | 6/1970 |

(Continued)

OTHER PUBLICATIONS

PCT International Search Report and Written Opinion, PCT/US2019/065469, dated Apr. 6, 2020, 19 pages.

*Primary Examiner* — James R Bidwell
(74) *Attorney, Agent, or Firm* — Quarles & Brady LLP (57) ABSTRACT

Embodiments of the disclosure provide an eyelink conveyor belt and sprocket assembly. The eyelink conveyor belt includes a plurality of eyelets, a plurality of reinforcing drive bars having a driving notch and extending adjacent to the plurality of eyelets, and a plurality of cross rods used to couple the reinforcing drive bars and eyelets together. The sprocket includes a generally disk-shaped drive member having a plurality of teeth formed along and extending outwardly from the outer perimeter of the drive member.

20 Claims, 6 Drawing Sheets

(56) References Cited

U.S. PATENT DOCUMENTS

| | | | |
|---|---|---|---|
| 2005/0170924 A1* | 8/2005 | Meya | B65G 23/06 474/155 |
| 2010/0115753 A1 | 5/2010 | Underberg et al. | |
| 2010/0263992 A1* | 10/2010 | Jones | B65G 23/06 198/834 |
| 2017/0129708 A1 | 5/2017 | Maine, Jr. et al. | |
| 2019/0263593 A1 | 8/2019 | Maine, Jr. et al. | |

FOREIGN PATENT DOCUMENTS

| | | |
|---|---|---|
| FR | 2815330 A1 | 4/2002 |
| NL | 1005979 C2 | 11/1998 |

* cited by examiner

EYELINK BELT DRIVE SYSTEMS AND METHODS

CROSS-REFERENCE TO RELATED APPLICATION

This application claims priority under 35 U.S.C. § 119 to U.S. Provisional Patent Application No. 62/779,226 filed on Dec. 13, 2018, the entire contents of which are incorporated herein by reference.

STATEMENT CONCERNING FEDERALLY SPONSORED RESEARCH AND DEVELOPMENT

Not applicable.

TECHNICAL FIELD

The present disclosure is described in the context of eyelink belt arrangements. More specifically, the present disclosure relates to eyelink belt drive systems and methods incorporating reinforcing bars and accompanying sprockets.

BACKGROUND

Eyelink belts are used for process conveying in various applications. Eyelink belts offer several advantages over other conveyor belt types, as they can provide variable opening sizes, a range of pitches and wire diameters, and a nearly two-dimensional support surface. Eyelink belts do not have a large depth dimension on the support surface, other than at the locations of the eyelets. This construction provides a relatively lightweight, yet sufficient, product support surface that can be more easily cleaned and maintained as compared to other types of wire belts.

Rows of reinforcing bars can be used in the construction of eyelink belts to enhance strength and stiffness to the belt assembly. The reinforcing bars can be arranged in single rows or in patterns of multiple stacked rows, depending on the strength requirements needed for the particular application. The reinforcing bars generally straddle eyelets and the drive sprocket, which rotates to move the eyelink belt and to convey items supported on the belt surface.

The reinforcing bars generally have two coupling holes that are used to couple adjacent reinforcing bars to one another and to couple the reinforcing bars to the eyelets in the eyelink belt. While the reinforcing bars strengthen and support portions of the belt, the eyelets provide the point of engagement for the drive sprocket. As the drive sprocket rotates, the teeth of the drive sprocket directly contact and leverage the eyelets in the eyelink belt to urge the eyelink belt.

The driving engagement between the eyelet and the sprocket teeth causes flexing of the eyelet that can become increasingly significant as the belt wears and elongates. This frequent cyclic loading and flexing can cause fatigue failure of the eyelets and the eyelink belt itself. Failure of this type can often result in pieces of broken wires that undesirably interfere with the overall operation of the eyelink belt, such as costly conveyor downtime and increased maintenance expenses.

Therefore, a need exists for an improved eyelink belt system that maintains the conventional features and benefits, while addressing various deficiencies associated with the implementation and operation of eyelink belt assemblies.

SUMMARY

This disclosure provides eyelink conveyor belt systems and methods that overcome the above-mentioned deficiencies in conventional eyelink belt assemblies by providing improved reinforcing bar, eyelet, and sprocket configurations. The reinforcing bars carry the tension within the conveyor belt, provide an engagement point for drive sprocket teeth, and prevent direct sprocket contact with the reinforcing bar eyelets. The sprocket has a readily manufacturable profile that limits unwanted lateral movement and misalignment of the eyelink belt during operation. Overall eyelink belt and sprocket assembly life is improved without detracting from the desirable eyelink belt properties.

Some embodiments of the disclosure provide an eyelink conveyor belt. The eyelink conveyor belt includes a plurality of eyelets, a plurality of reinforcing bars extending adjacent to the plurality of eyelets, and a plurality of cross rods. The eyelets extend approximately parallel to one another and each include openings formed through each end of each respective eyelet. The plurality of reinforcing bars each have a generally elongated shape extending axially along a longitudinal axis and have through holes formed transversely to the longitudinal axis near each axial end of the reinforcing bar. Each reinforcing bar includes a driving notch. The driving notch extends inward from an outer perimeter of the reinforcing bar toward the longitudinal axis. The plurality of cross rods extend through the openings and through the through holes to couple the plurality of eyelets and the plurality of reinforcing bars together.

Some embodiments of the disclosure provide a sprocket for driving an eyelink conveyor belt. The sprocket has a generally disk-shaped drive member and a plurality of teeth. The generally disk-shaped drive member has a first surface and a second surface opposite the first surface and spaced apart from the first surface by a thickness. The generally disk-shaped drive member has a polygonal outer perimeter. The plurality of teeth are formed along and extend from the polygonal outer perimeter. The plurality of teeth each have a first tooth face and a second tooth face each extending away from a base on the generally polygonal outer perimeter. The first tooth face and the second tooth face taper toward a tooth crest.

Some embodiments of the invention provide an eyelink belt and sprocket assembly. The assembly includes a sprocket for driving an eyelink conveyor belt. The sprocket has a generally disk-shaped drive member and a plurality of teeth. The generally disk-shaped drive member has a first surface and a second surface opposite the first surface and spaced apart from the first surface by a thickness. The generally disk-shaped drive member has a polygonal outer perimeter. The plurality of teeth are formed along and extend from the polygonal outer perimeter. The plurality of teeth each have a first tooth face and a second tooth face each extending away from a base on the generally polygonal outer perimeter. The first tooth face and the second tooth face taper toward a tooth crest. The eyelink belt is engaged by the sprocket and includes a plurality of eyelets, a plurality of reinforcing bars extending adjacent to the plurality of eyelets, and a plurality of cross rods. The eyelets extend approximately parallel to one another and each include openings formed through each end of each respective eyelet. The plurality of reinforcing bars each have a generally elongated shape extending axially along a longitudinal axis and have through holes formed transversely to the longitudinal axis near each axial end of the reinforcing bar. Each reinforcing bar includes a driving notch formed intermediate the through holes. The driving notch extends inward from an outer perimeter of the reinforcing bar toward the longitudinal axis. The plurality of cross rods extend through the openings and through the through holes to couple the plurality of eyelets and the plurality of reinforcing bars together. At least one of the plurality of teeth is configured to be received within and engaged with the driving notch in one of the plurality of reinforcing bars.

DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
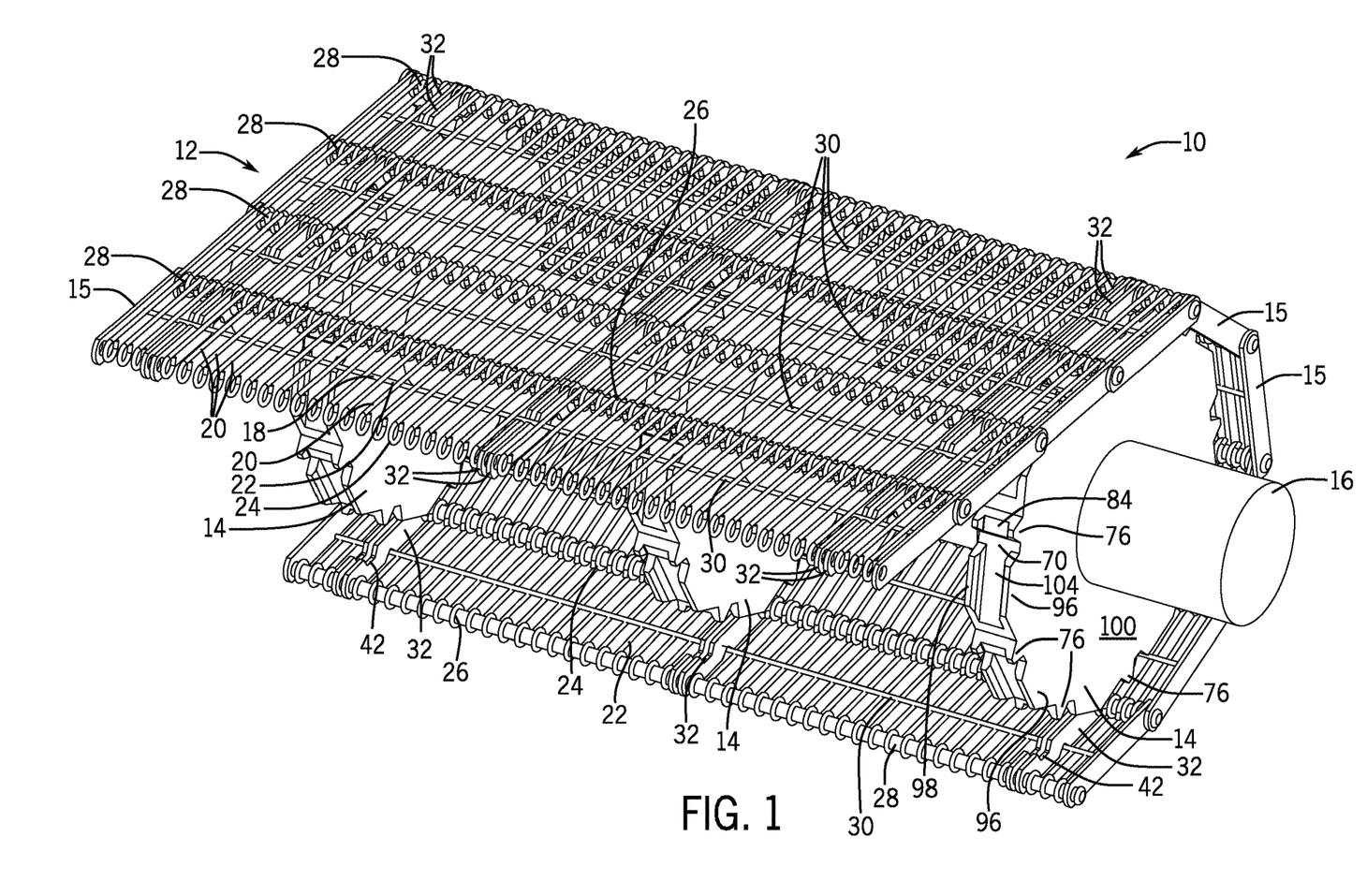
FIG. 1 is a top isometric view of a partial eyelink belt and sprocket assembly according to an embodiment of the disclosure.
Figure 2:
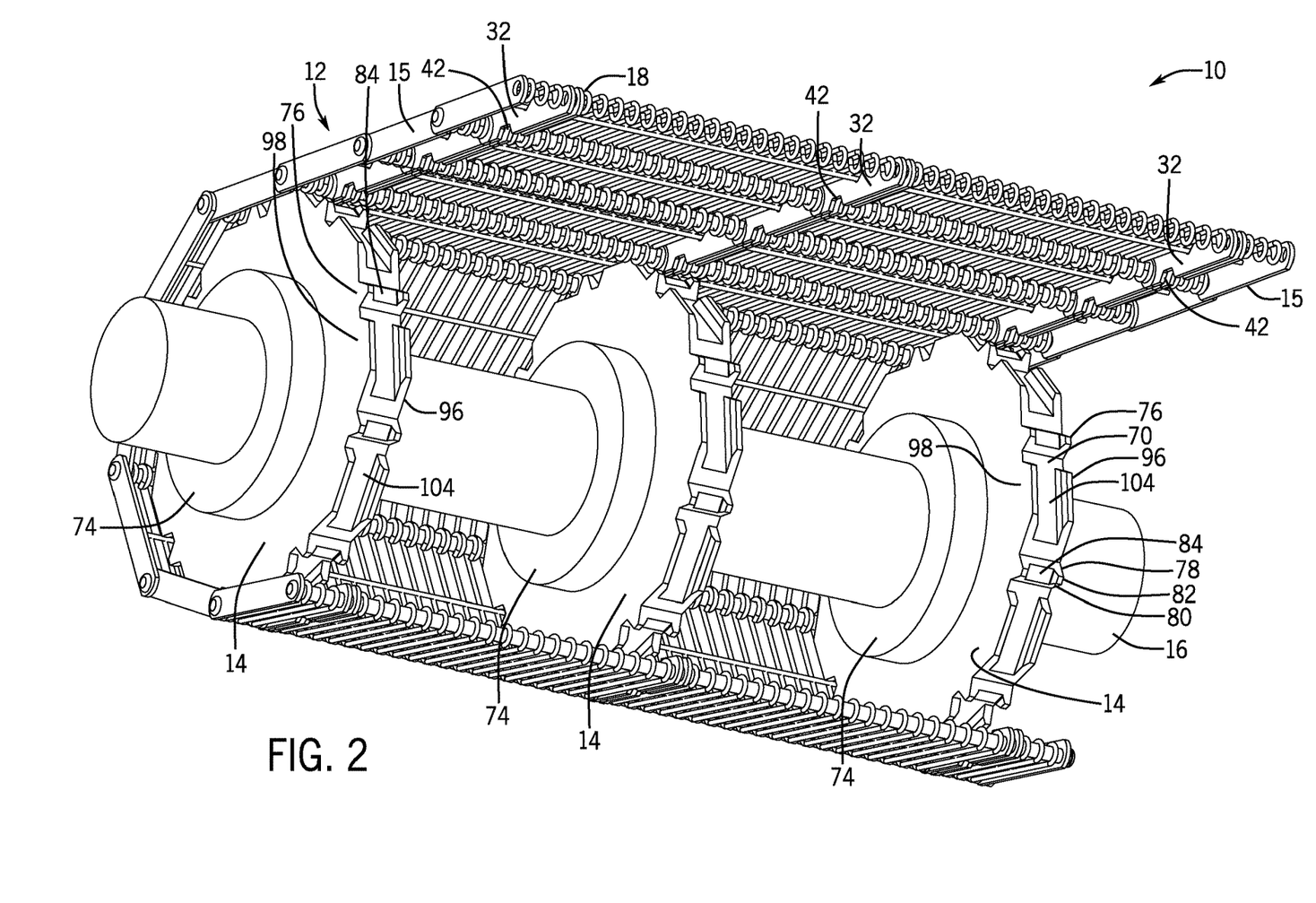
FIG. 2 is a bottom isometric view of the eyelink belt and sprocket assembly of FIG. 1.
Figure 3:
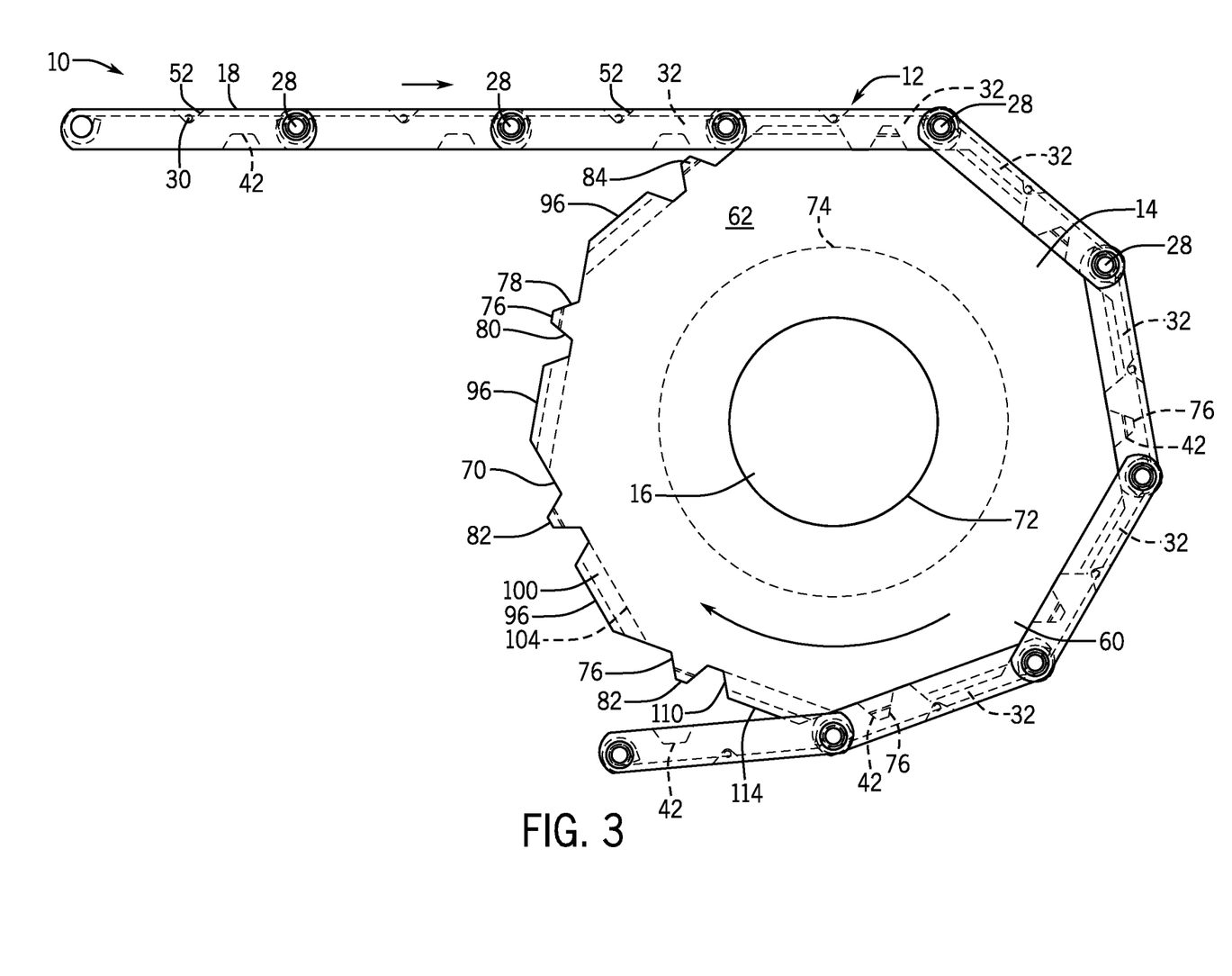
FIG. 3 is a side view of the eyelink belt and sprocket assembly of FIG. 1.

FIGS. 1-3 illustrate an eyelink conveyor belt and sprocket assembly 10 according to one embodiment of the invention. The assembly 10 includes an eyelink conveyor belt 12 that is rotatably driven by one or more sprockets 14 coupled to a drive shaft 16. A motor (not shown) imparts a torque to the drive shaft 16, which rotates the drive shaft 16 and sprockets 14. The sprockets 14 can be secured to the drive shaft 16 for co-rotation by a variety of conventional techniques (e.g., keys/keyways, friction welding). The sprockets 14 interface with the eyelink conveyor belt 12 and transfer the rotational force from the drive shaft 16 to the eyelink conveyor belt 12, which then rotates in concert with the sprocket 14. Because the eyelink conveyor belt 12 is a continuous belt, rotation of the eyelink conveyor belt 12 moves a conveying surface 18 (e.g., an upward-facing surface) of the eyelink conveyor belt 12 in a conveying direction generally tangential to the sprocket 14. Items supported on the conveying surface 18 of the eyelink conveyor belt 12 are transported as a result of the sprocket 14 rotation.

The eyelink conveyor belt 12 is formed of a series of eyelets 20 extending generally parallel to one another to define the upper conveying surface 18. Each eyelet 20 in the eyelink conveyor belt can be uniformly shaped to include a support section 22 extending between at least two openings 24, 26 positioned or formed at each end of the eyelet 20. For example, each of the eyelets 20 can be made of a corrosion resistant wire (e.g., aluminum or stainless steel) that is bent at each end to define the openings 24, 26. Cross rods 28 extend transversely to the eyelets 20 and through the openings 24, 26 to couple adjacent eyelets 20 (both along a width of the eyelink conveyor belt 12 and along the conveying direction) to one another and provide support to the eyelink conveyor belt 12. In some examples, the eyelets 20 are pivotally coupled to the cross rods 28. To provide additional support, cross wires 30 spaced apart from and extending generally parallel to the cross rods 28 can be welded or otherwise coupled to an underside of the support sections 22 on each eyelet 20. In some examples, both the cross rods 28 and the cross wires 30 extend entirely across each eyelet 20 in the eyelink conveyor belt 12. In one embodiment, side bars 15 are located on lateral sides of the eyelink conveyor belt 12, and are connected to the cross rods 28, such as by swaging the ends of the cross rod 28. In other embodiments, the side bars 15 may be replaced with reinforcing drive bars 32 as described below. Other suitable orientations and arrangements for the eyelink conveyor belt 12 are shown and described in commonly-owned U.S. patent application Ser. No. 15/347,265, entitled "Modular Eyelink Conveyor Belt," which is incorporated by reference herein in its entirety.

Figure 4A:
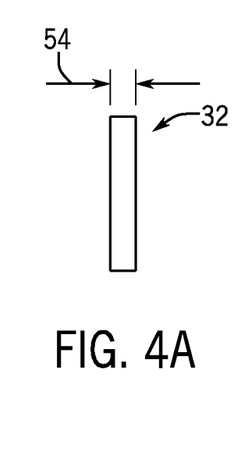
FIG. 4A is a front view of a reinforcing bar present in the eyelink belt and sprocket assembly of FIG. 1.
Figure 4B:
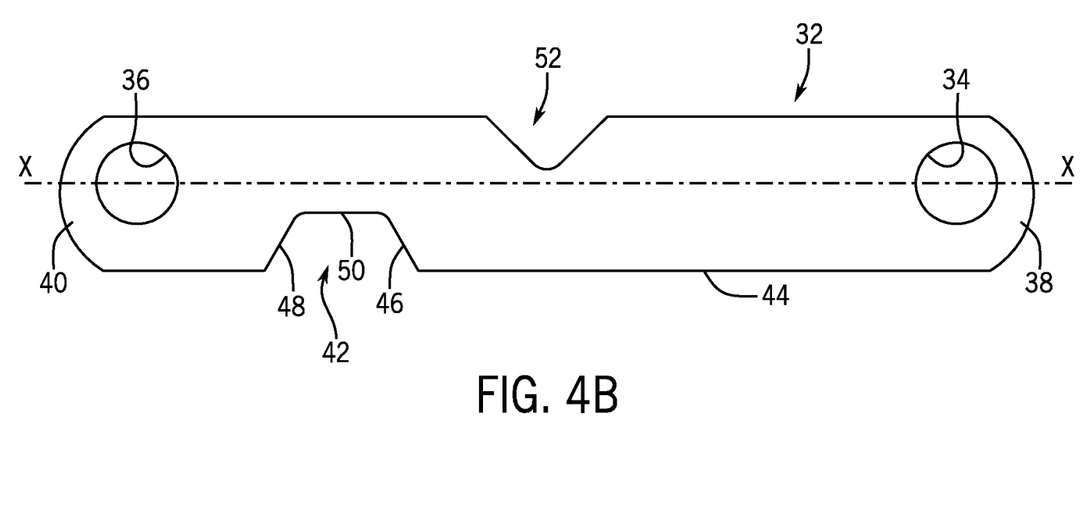
FIG. 4B is a side view of the reinforcing bar of FIG. 4A.

Reinforcing drive bars 32 extend adjacent to the eyelets 20 in the eyelink conveyor belt 12. The reinforcing drive bars 32 provide an engagement interface with the sprocket 14 and fortify the eyelink conveyor belt 12. As shown in FIGS. 4A and 4B, the reinforcing drive bars 32 have a generally elongated shape extending axially along a longitudinal axis X-X. Through holes 34, 36 are formed through each axial end 38, 40 of the reinforcing drive bars 32, which can have a rounded, convex shape. The through holes 34, 36 extend transversely to the longitudinal axis X-X and receive and pivotally couple with the cross rods 28 that extend across the eyelink conveyor belt 12. The reinforcing drive bars 32 can be individually positioned between groups of eyelets 20 or grouped together in groups of two or more on the eyelink conveyor belt 12, as illustrated in FIGS. 1-3. In some embodiments, the through holes 34, 36 are offset from the longitudinal axis X-X (e.g., located closer to the upper conveying surface 18).

A driving notch 42 is formed in the reinforcing bar 32 to receive and translate rotational and lateral forces imparted between the sprockets 14, the eyelets 20, and the eyelink belt 12 generally. The driving notch 42 is formed axially between the through holes 34, 36 and extends inward from an outer perimeter 44 of the reinforcing bar 32 toward the longitudinal axis X-X. The driving notch 42 can define a generally trapezoidal void with two inwardly extending side walls 46, 48 and a base surface 50. The side walls 46, 48 extend away from the outer perimeter 44 of the reinforcing bar 32 to the base surface 50, which can extend approximately parallel to the longitudinal axis X-X. In some embodiments, the side walls 46, 48 are equally sized and angle inward toward the base surface 50 to define a general isosceles trapezoidal void shape. Optionally, the driving notch 42 can be biased toward one end of the reinforcing bar 32. For example, the driving notch 42 can be axially offset along the longitudinal axis X-X toward one of the first axial end 38 or the second axial end 40 of the reinforcing bar 32. The form factor defined by the driving notch 42 can encompass a variety of contours, such as an involute gear profile. As described below, the driving notch 42 is contoured in concert with the mating form factor defined by engagement with the sprocket 14.

In some embodiments, a V-shaped notch 52 also extends inwardly from the outer perimeter 44 of the reinforcing bar. The V-shaped notch 52 can be approximately centered between the two axial ends 38, 40 of the reinforcing bar 32 to receive and support the cross wires 30 extending across the eyelink conveyor belt 12. The cross wire 30 sits within the V-shaped notch 52 and can be welded or otherwise coupled to the reinforcing bar to further couple the reinforcing bar 32 to the eyelink conveyor belt 12. As illustrated, the V-shaped notch 52 can be formed in the reinforcing bar 32 opposite the driving notch 42. The relative placement and location of the driving notch 42 and the V-shaped notch 52 can be adapted to address various application specific requirements and considerations, such as accounting for material properties (e.g., strength, ductility) of the reinforcing drive bar 32 in combination with the tensile and/or other loading constraints applied to the reinforcing drive bar 32 during use.

Figure 5A:
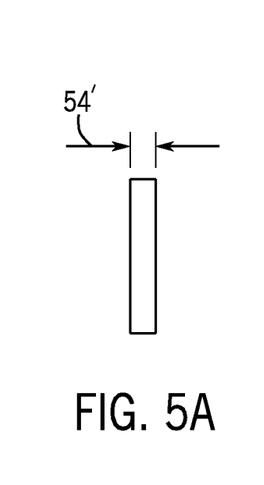
FIG. 5A is a front view of an alternative embodiment of a reinforcing bar that can be used in the eyelink belt and sprocket assembly of FIG. 1.
Figure 5B:
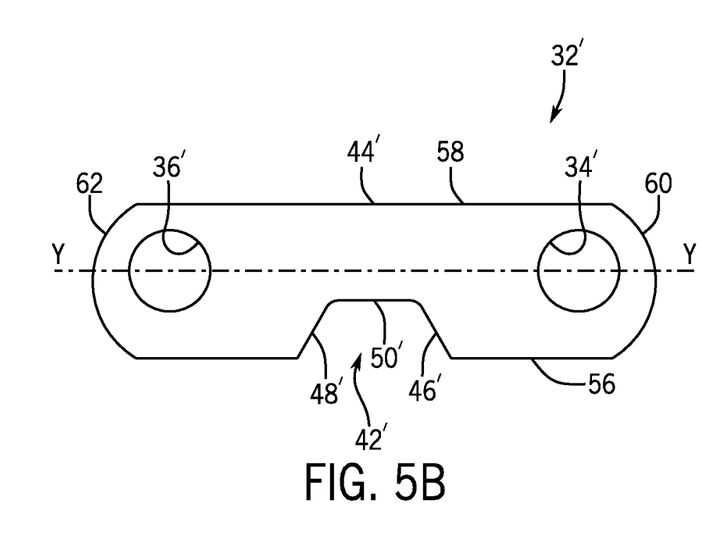
FIG. 5B is a side view of the alternative reinforcing bar of FIG. 5A.

FIGS. 5A and 5B illustrate an alternative embodiment of a reinforcing drive bar 32' that can be incorporated into the eyelink conveyor belt 12. The reinforcing drive bar 32' also has a generally elongated shape formed of two perimeter walls 56, 58 about the outer perimeter 44' extending generally parallel to a longitudinal axis Y-Y. Rounded, convex ends 60, 62 extend between the two perimeter walls 56, 58. Through holes 34', 36' are formed through the reinforcing drive bar 32' to receive and couple with the cross rods 28 that extend across the eyelink conveyor belt 12. A driving notch 42' extends inward from one of the two perimeter walls 56, 58 and has a generally trapezoidal shape again defined by side walls 46', 48' and a base surface 50'. The driving notch 42' is approximately centered between the two through holes 34', 36'. The V-shaped notch can be omitted, such as when the particular application requirements permit.

The reinforcing drive bars 32, 32', like the eyelets 20, can be formed of a strong, corrosion-resistant material. For example, the reinforcing drive bars 32, 32' can be formed of a machined stainless steel bar stock having a thickness 54, 54'. Alternatively, the reinforcing drive bars 32, 32' can be formed of a polymeric material with sufficient strength and wear resistance to cyclically contact the sprocket 14, as detailed below.

Figure 6A:
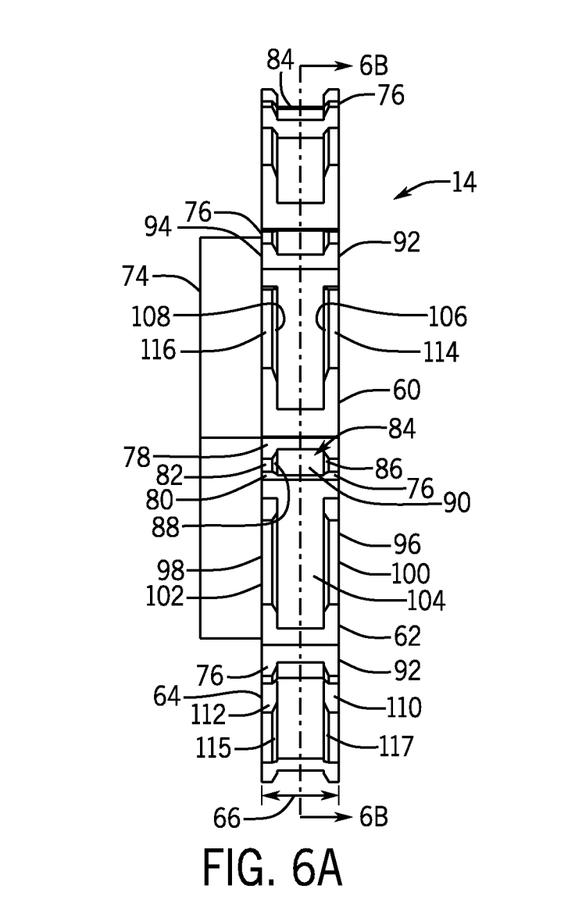
FIG. 6A is a side view of a sprocket from the eyelink belt and sprocket assembly of FIG. 1 in isolation.
Figure 6B:
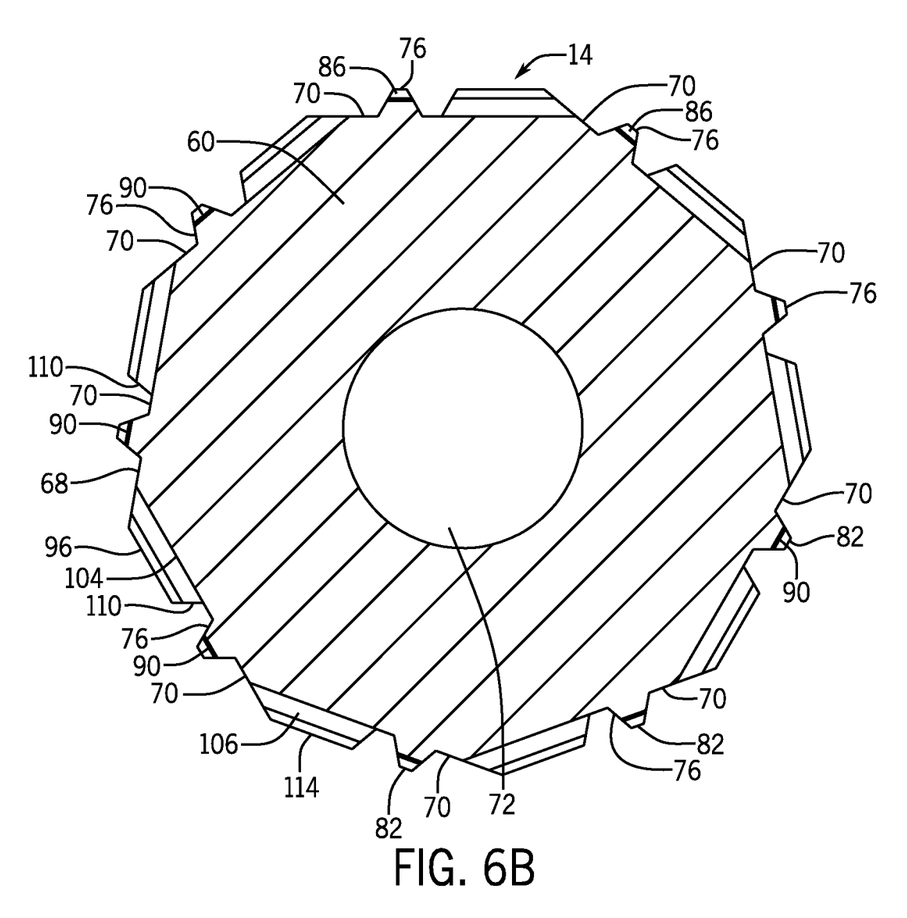
FIG. 6B is a cross-sectional view of the sprocket from FIG. 6A taken along line 6B-6B.

The sprockets 14 engage the reinforcing drive bars 32 to drive the eyelink conveyor belt 12. As illustrated in FIGS. 6A and 6B, the sprocket 14 has a generally disk-shaped drive member 60. The generally disk-shaped drive member 60 includes a first surface 62 and a second surface 64 spaced apart from the first surface 62 by a thickness 66. The generally disk-shaped drive member 60 has a polygonal outer perimeter 68 formed of a series of planar bases 70. For example, the outer perimeter 68 can be formed by nine uniformly planar bases 70 each offset from one another by an angle of 140 degrees. A driving interface, such as a shaft bore 72 is formed through a center of the drive member 60 to receive and couple (e.g., press-fit, friction weld, keyway/key) with the drive shaft 16. In some examples, a cylindrical boss 74 surrounds the shaft bore 72 and extends outwardly away from one or more of the first surface 62 and the second surface 64 of the drive member 60. Various other driving interfaces are available, such as gears, belts, and electromagnets.

Teeth 76 are formed along the outer perimeter 68 of the drive member 60. The teeth 76 extend outwardly from the bases 70 and can mesh with the driving notches 42, 42' formed in the reinforcing drive bars 32, 32'. The teeth 76 each have a first tooth face 78 and a second tooth face 80 extending away from the base 70. As the first tooth face 78 and second tooth face 80 extend away (e.g., radially outward from the center of the drive member 60) from the base 70, they taper inward toward a tooth crest 82 that juts outward from the base 70. The tooth crest 82 can have a generally planar surface that extends parallel to the base 70 from which that tooth 76 extends from.

A channel 84 can be formed within the tooth crest 82 of each tooth 76 to provide lateral stability for the reinforcing drive bars 32, 32' as they are driven by the teeth 76. The channel 84 is defined by a first channel side wall 86, a second channel side wall 88, and a channel base wall 90. The first channel side wall 86 and second channel side wall 88 extend inward from the tooth crest 82 to the channel base wall 90, which extends entirely through the first tooth face 78 and the second tooth face 80. In some examples, the channel 84 is formed approximately equidistant from the first surface 62 and the second surface 64 of the drive member 60.

The first tooth face 78, second tooth face 80, and tooth crest 82 can each extend entirely across the drive member 60, from the first surface 62 to the second surface 64. In some examples, the first tooth face 78 and second tooth face 80 each extend between a first tooth wall 92 and a second tooth wall 94. The first tooth wall 92 can be coplanar with the first surface 62, while the second tooth wall 94 can be coplanar with the second surface 64.

The sprocket 14 can also be equipped with flanges 96, 98 extending outward from the bases 70 on the drive member 60. The flanges 96, 98 aide in tracking the eyelink conveyor belt 12 and limit the lateral movement of the eyelink belt 12 that could otherwise create misalignment between the eyelink conveyor belt 12 and the sprockets 14. The one or more flanges 96, 98 can be positioned between each adjacent tooth 76 on the drive member 60 to serve as a guide for reinforcing drive bars 32, 32' as they are driven by the teeth 76. The flanges 96, 98 can have outer surfaces 100, 102 that are coplanar with the first surface 62 and second surface 64 of the drive member 60, respectively.

In some examples, the two opposing flanges 96, 98 are positioned between each adjacent tooth 76. The flanges 96, 98 each extend outwardly from the base 70, and are spaced apart from one another to form a guide channel 104 generally coplanar with the base 70. Inward facing surfaces 106, 108 of the two, opposing flanges and the base 70 together define the guide channel 104, which extends entirely through the flanges 96, 98. The flanges 96, 98 can each include angled surfaces 110, 112 that extend away from the base 70 to upper surfaces 114, 116 that are coplanar with the tooth crest 82. Skewed surfaces 115, 117 connect respective inward facing surfaces 106, 108 and upper surfaces 114, 116. In other examples, only one flange 96, 98 is formed between each tooth 76, and the side the flange 96, 98 is formed on alternates between each successive tooth 76. The alternating flange 96, 98 design may improve the manufacturability of the sprocket 14, as it can be more readily injection molded with the aforementioned design. Additionally, the sprocket 14 can be formed of a corrosion-resistant material, including polymeric and metallic components. In some examples, the eyelets 20, reinforcing drive bars 32, cross rods 28, cross wires 30, and sprocket 14 are all made from a metallic material, like aluminum or stainless steel.

As shown in FIGS. 1-3, the eyelink conveyor belt and sprocket assembly 10 is driven by the teeth 76 on the sprocket 14, which engage the drive notches 42 formed in the reinforcing drive bars 32. In some embodiments, the reinforcing drive bars 32 that are engaged by the teeth 76 are received within the channel 84 formed in each tooth 76. The first channel side wall 86 and second channel side wall 88, along with the inward facing surfaces 106, 108 of the flanges 96, 98 together guide the reinforcing drive bars 32 and inhibit lateral motion of the reinforcing drive bars 32 as they are driven by the sprocket 14. Depending on the direction of sprocket 14 rotation, one of the tooth faces 78, 80 acts as the driving face and primarily engages one of the side walls 46, 48 of the driving notch 42 in the reinforcing drive bar 32 (or plurality of stacked or adjacent reinforcing drive bars 32). The reinforcing drive bars 32 pivot about the cross rods 28 so that the conveying surface 18 of the eyelink conveyor belt 12 extends approximately parallel to each base 70 having a tooth 76 engaging a drive notch 42 on the reinforcing drive bars 32.

As shown in FIG. 3, the clockwise rotation of the sprocket 14 pulls the reinforcing drive bars 32 engaged with the sprocket 14, which in turn pulls the entire eyelink conveyor belt 12 along as well. The eyelink conveyor belt 12 can be engaged by several teeth 76 simultaneously to spread out the loading experienced by each individual reinforcing bar 32. As illustrated, five of the nine teeth 76 engage at least five reinforcing drive bars 32 at any given time during sprocket 14 operation. As the eyelink conveyor belt 12 illustrated includes reinforcing drive bars 32 in groups of two, each tooth 76 engages two, parallel reinforcing drive bars 32 generally simultaneously. This orientation avoids sprocket 14 contact with eyelets 20, which can greatly improve the operational life of the eyelink conveyor belt 12 by limiting the stresses experienced by potential wear components. Once the reinforcing drive bars 32 have been effectively rotated around the sprocket 14, gravity and the decreased tension in the eyelink conveyor belt 12 allows the notches to release from the teeth 76, so that the sprocket 14 can continue driving other sections of the eyelink conveyor belt 12.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. For example, the spacing, size, gauge, form-factor, and other features may vary based on application-specific requirements (e.g., product to be conveyed, environmental factors, speed of conveyance, operational envelope limitations, etc.). As one alternative, the form factor of the driving notch and the mating teeth can be modified to reflect a variety of engagement interfaces. In addition, while the embodiments have been described in context of a metallic construction, it is contemplated that other materials (e.g., polymers) or composite constructions (e.g., a metallic base with a plastic overmold) are possible. Other types of conveyor belts may also benefit from the incorporation of aspects of the invention. The entire disclosure of each patent and publication cited herein is incorporated by reference, as if each such patent or publication were individually incorporated by reference herein. Various features and advantages of the invention are set forth in the following claims.

The invention claimed is:

1. An eyelink conveyor belt comprising:
a plurality of eyelets extending approximately parallel to one another and each including openings formed through each end of each respective eyelet;
a plurality of reinforcing drive bars extending adjacent to the plurality of eyelets, the plurality of reinforcing drive bars each having a generally elongated shape extending axially along a longitudinal axis and having through holes formed transversely to the longitudinal axis at each axial end thereof, each reinforcing bar including a driving notch extending inward from an outer perimeter of the reinforcing bar toward the longitudinal axis; and
a plurality of cross rods, the plurality of cross rods extending through the openings and through the through holes to couple the plurality of eyelets and the plurality of reinforcing drive bars together;
wherein the through holes formed through each of the reinforcing drive bars include a first through hole formed at a first axial end of the reinforcing bar and a second through hole formed at a second axial end of the reinforcing bar, and the driving notch is offset toward the first through hole.

2. The eyelink conveyor belt of claim 1, wherein the driving notch is defined by a generally trapezoidal shape.

3. The eyelink conveyor belt of claim 2, wherein a surface of the driving notch formed furthest inward from the outer perimeter of the reinforcing bar extends parallel to the longitudinal axis.

4. The eyelink conveyor belt of claim 1, wherein the first through hole and the second through hole are offset from the longitudinal axis.

5. An eyelink conveyor belt comprising:
a plurality of eyelets extending approximately parallel to one another and each including openings formed through each end of each respective eyelet;
a plurality of reinforcing drive bars extending adjacent to the plurality of eyelets, the plurality of reinforcing drive bars each having a generally elongated shape extending axially along a longitudinal axis and having through holes formed transversely to the longitudinal axis at each axial end thereof, each reinforcing bar including a driving notch extending inward from an outer perimeter of the reinforcing bar toward the longitudinal axis; and a plurality of cross rods, the plurality of cross rods extending through the openings and through the through holes to couple the plurality of eyelets and the plurality of reinforcing drive bars together;

wherein:
the generally elongated shape of each reinforcing bar is at least partially defined by two spaced apart walls extending parallel to the longitudinal axis and two sections extending between the two walls at opposite axial ends of the reinforcing bar; and
the driving notch is formed inward from one of the two spaced apart walls and a V-shaped notch is formed inward from the other of the two spaced apart walls.

6. The eyelink conveyor belt of claim 5, wherein the driving notch is positioned intermediate of the through holes.

7. The eyelink conveyor belt of claim 5, wherein the through holes formed through each of the reinforcing drive bars include a first through hole formed at a first axial end of the reinforcing bar and a second through hole formed at a second axial end of the reinforcing bar, and the driving notch is offset toward the first through hole.

8. The eyelink conveyor belt of claim 5, wherein:
the two sections are rounded and extend convexly between the two walls; and
the V-shaped notch is centered between the through holes in the reinforcing bar.

9. A sprocket for driving a conveyor belt, the sprocket comprising:
a generally disk-shaped drive member having a first surface, a second surface opposite the first surface and spaced apart from the first surface by a thickness, and a polygonal outer perimeter; and
a plurality of teeth formed along and extending from the polygonal outer perimeter, the plurality of teeth each having a first tooth face and a second tooth face extending away from a base on the generally polygonal outer perimeter and tapering to a tooth crest;
wherein a channel is formed within the tooth crest of each of the plurality of teeth, the channel being defined by a channel base wall, a first channel side wall, and a second channel side wall opposite the first channel side wall, the channel base wall, first channel side wall, and second channel side wall each extending from the first tooth face through to the second tooth face.

10. The sprocket of claim 9, wherein the channel is formed approximately equidistant from the first surface and the second surface of the drive member.

11. The sprocket of claim 9, wherein the tooth crest is a planar surface extending parallel to the base.

12. A sprocket for driving a conveyor belt, the sprocket comprising:
a generally disk-shaped drive member having a first surface, a second surface opposite the first surface and spaced apart from the first surface by a thickness, and a polygonal outer perimeter; and
a plurality of teeth formed along and extending from the polygonal outer perimeter, the plurality of teeth each having a first tooth face and a second tooth face extending away from a base on the generally polygonal outer perimeter and tapering to a tooth crest;
wherein a flange is positioned between each adjacent tooth, the flange extending from the base and having an outer surface coplanar with one of the first surface or the second surface of the drive member.

13. The sprocket of claim 12, wherein a channel is formed within the tooth crest of each of the plurality of teeth, the channel being defined by a channel base wall, a first channel side wall, and a second channel side wall opposite the first channel side wall, the channel base wall, first channel side wall, and second channel side wall each extending from the first tooth face through to the second tooth face.

14. A sprocket for driving a conveyor belt, the sprocket comprising:
a generally disk-shaped drive member having a first surface, a second surface opposite the first surface and spaced apart from the first surface by a thickness, and a polygonal outer perimeter; and
a plurality of teeth formed along and extending from the polygonal outer perimeter, the plurality of teeth each having a first tooth face and a second tooth face extending away from a base on the generally polygonal outer perimeter and tapering to a tooth crest;
wherein the first tooth face and the second tooth face each extend entirely across the drive member from the first surface to the second surface.

15. A sprocket for driving a conveyor belt, the sprocket comprising:
a generally disk-shaped drive member having a first surface, a second surface opposite the first surface and spaced apart from the first surface by a thickness, and a polygonal outer perimeter; and
a plurality of teeth formed along and extending from the polygonal outer perimeter, the plurality of teeth each having a first tooth face and a second tooth face extending away from a base on the generally polygonal outer perimeter and tapering to a tooth crest;
wherein two opposing flanges are positioned between each adjacent tooth and extend from the base, one of the two flanges having an outer surface coplanar with the first surface and the other of the two flanges having an outer surface coplanar with the second surface.

16. The sprocket of claim 15, wherein the two opposing flanges are spaced apart from one another and inward facing surfaces of the two opposing flanges together with the base define a guide channel.

17. The sprocket of claim 16, wherein the two opposing flanges each have an upper surface coplanar with the tooth crest.

18. A sprocket for driving a conveyor belt, the sprocket comprising:
a generally disk-shaped drive member having a first surface, a second surface opposite the first surface and spaced apart from the first surface by a thickness, and a polygonal outer perimeter; and
a plurality of teeth formed along and extending from the polygonal outer perimeter, the plurality of teeth each having a first tooth face and a second tooth face extending away from a base on the generally polygonal outer perimeter and tapering to a tooth crest;
wherein the polygonal outer perimeter of the drive member is defined by nine bases of equal length.

19. The sprocket of claim 18, wherein one of the plurality of teeth extends outwardly from each of the nine bases.

20. An eyelink belt and sprocket assembly, the assembly comprising:

a sprocket comprising:
- a generally disk-shaped drive member having a first surface, a second surface opposite the first surface and spaced apart from the first surface by a thickness, and a polygonal outer perimeter; and
- a plurality of teeth formed along and extending from the polygonal outer perimeter, the plurality of teeth each having a first tooth face and a second tooth face extending away from a base on the generally polygonal outer perimeter and tapering to a tooth crest; and an eyelink conveyor belt engaged with the sprocket comprising:
- a plurality of eyelets extending approximately parallel to one another and each including openings formed through each end of each respective eyelet;
- a plurality of reinforcing drive bars extending adjacent to the plurality of eyelets, the plurality of reinforcing drive bars each having a generally elongated shape extending axially along a longitudinal axis and having through holes formed transversely to the longitudinal axis near each axial end thereof, each reinforcing bar including a driving notch intermediate and offset toward one of the through holes and extending inward from an outer perimeter of the reinforcing bar toward the longitudinal axis; and
- a plurality of cross rods, the plurality of cross rods extending through the openings and through the through holes to couple the plurality of eyelets and the plurality of reinforcing drive bars together;

wherein at least one of the plurality of teeth is configured to be received within and engaged with the driving notch in one of the plurality of reinforcing drive bars.

* * * * *